United States Patent
Riley et al.

(10) Patent No.: US 8,073,279 B2
(45) Date of Patent: Dec. 6, 2011

(54) AUTOMATED ATMOSPHERIC CHARACTERIZATION OF REMOTELY SENSED MULTI-SPECTRAL IMAGERY

(75) Inventors: Ronald A. Riley, Melbourne, FL (US); Tariq Bakir, Melbourne, FL (US); Eric Spellman, Viera, FL (US)

(73) Assignee: Harris Corporation, Melbourne, FL (US)

( * ) Notice: Subject to any disclaimer, the term of this patent is extended or adjusted under 35 U.S.C. 154(b) by 781 days.

(21) Appl. No.: 12/169,427

(22) Filed: Jul. 8, 2008

(65) Prior Publication Data

US 2010/0008595 A1      Jan. 14, 2010

(51) Int. Cl.
G06K 9/40    (2006.01)
G06K 9/00    (2006.01)

(52) U.S. Cl. ........................ 382/254; 382/100
(58) Field of Classification Search .................. 382/100, 382/103, 106, 108, 254, 312; 348/143–149; 250/390.02, 390.07; 356/3, 302, 303, 326
See application file for complete search history.

(56) References Cited

U.S. PATENT DOCUMENTS

| | | | |
|---|---|---|---|
| 5,034,986 A | 7/1991 | Karmann et al. | |
| 5,265,172 A | 11/1993 | Markandey et al. | |
| 5,324,113 A | 6/1994 | Ingram, Jr. et al. | |
| 5,627,905 A | 5/1997 | Sebok et al. | |
| 5,680,487 A | 10/1997 | Markandey | |
| 5,884,226 A | 3/1999 | Anderson et al. | |
| 5,949,914 A | 9/1999 | Yuen | |
| 6,011,875 A | 1/2000 | Laben et al. | |
| 6,097,835 A | 8/2000 | Lindgren | |
| 6,937,774 B1 | 8/2005 | Specht et al. | |
| 7,298,922 B1 | 11/2007 | Lindgren et al. | |
| 7,369,229 B2 * | 5/2008 | Bissett et al. | 356/328 |
| 7,400,770 B2 | 7/2008 | Keaton et al. | |
| 7,491,944 B1 * | 2/2009 | Stork et al. | 250/390.07 |

(Continued)

FOREIGN PATENT DOCUMENTS

CA      2670611 A1      6/2008

(Continued)

OTHER PUBLICATIONS

Bunting P et al: "An Area based Technique for Image-to-Image Registration of Multi-Modal Remote Sensing Data", Geoscience and Remote Sensing Symposium, 2008. IGARSS 2008. IEEE International, IEEE, Piscataway, NJ, USA, Jul. 7, 2008, pp. V-212, XP031423198.

(Continued)

Primary Examiner — Yon Couso
(74) Attorney, Agent, or Firm — Fox Rothschild, LLP; Robert J. Sacco

(57) ABSTRACT

A method for processing remotely acquired imagery data includes identifying a region of lowest intensity in each of a plurality of different images for a plurality of different spectral bands and estimating first values for upwelling path radiance for each of the different images according to an intensity in the region in each of the different images. The method further includes selecting a visibility value and calculating second values for the upwelling path radiance for each of the different images, each of the second values based on a radiation transfer model, the radiation model generated using the visibility value and the meta-data. The method can also include comparing the first and the second values for the upwelling path radiance for the different images, adjusting the visibility value based on the comparison, and repeating the calculating, the comparing, and the adjusting steps until a termination condition is met.

20 Claims, 5 Drawing Sheets

U.S. PATENT DOCUMENTS

| | | | |
|---|---|---|---|
| 7,620,203 | B1 | 11/2009 | Simmons et al. |
| 2002/0096622 | A1 | 7/2002 | Adler-Golden et al. |
| 2004/0075667 | A1 | 4/2004 | Burky et al. |
| 2004/0130702 | A1 | 7/2004 | Jupp et al. |
| 2004/0141659 | A1 | 7/2004 | Zhang |
| 2004/0164235 | A1 | 8/2004 | Miller |
| 2004/0264796 | A1 | 12/2004 | Turner et al. |
| 2005/0094887 | A1 | 5/2005 | Cakir et al. |
| 2005/0111754 | A1 | 5/2005 | Cakir et al. |
| 2006/0126959 | A1 | 6/2006 | Padwick et al. |
| 2006/0269158 | A1 | 11/2006 | O'Hara et al. |
| 2008/0037865 | A1 | 2/2008 | Vetter et al. |
| 2008/0037869 | A1 | 2/2008 | Zhou |
| 2008/0089558 | A1 | 4/2008 | Vadon et al. |
| 2008/0112649 | A1 | 5/2008 | Chen et al. |
| 2008/0129752 | A1 | 6/2008 | Riley et al. |
| 2008/0131024 | A1 | 6/2008 | Riley et al. |
| 2008/0131025 | A1 | 6/2008 | Riley et al. |
| 2010/0002947 | A1 | 1/2010 | Riley et al. |
| 2010/0008598 | A1 | 1/2010 | Riley et al. |
| 2010/0032557 | A1* | 2/2010 | Schiller .................. 250/252.1 |
| 2010/0189363 | A1 | 7/2010 | Riley et al. |
| 2010/0226570 | A1 | 9/2010 | Riley et al. |

FOREIGN PATENT DOCUMENTS

| | | |
|---|---|---|
| WO | WO 98/41079 | 9/1998 |
| WO | WO 2006/065741 | 6/2006 |
| WO | WO 2008/067517 | 6/2008 |
| WO | WO 2008/070542 | 6/2008 |
| WO | WO 2008/070544 | 6/2008 |

OTHER PUBLICATIONS

Walli K C: "Automated multisensor image registration", Applied Imagery Pattern Recognition Workshop, 2003. Proceedings. 32nd Washington, DC, USA Oct. 5-17, 2003, Piscataway, NJ, USA, IEEE, pp. 103-107, XP010695062.

Lemoigne J. et al: "Use of Multiresolution Wavelet Feature Pyramids for Automatic Registration of Multisensor Imagery", IEEE Transactions on Image Processing, IEEE Service Center, Piscataway, NJ, US, vol. 14, No. 6, Jun. 1, 2005, pp. 770-782, XP011131847.

Chi-Farn Chen et al: "Fully Automatic and Robust Approach for Remote Sensing Image Registration", Nov. 13, 2007, Progress in Pattern Recognition, Image Analysis and Applications; [Lecture Notes in Computer Science], Springer Berlin Heidelberg, Berlin, Heidelberg, pp. 891-900, XP019083038.

Perkins, T, et al.: "Retrieval of atmospheric properties from hyper and multispectral imagery with the FLAASH atmospheric correction algorithm" SPIE, PO Box 10 Bellingham WA 98227-0010 USA, vol. 5979, Oct. 31, 2005, XP040211109.

Xu; C., et al.: "Evaluation of the surface reflectance retrieval on the satellite data", SPIE, PO Box 10 Bellingham WA 98227-0010 USA, vol. 6752, Aug. 8, 2007, XP040247396.

Richter et al.: "Influence of the Adjacency Effect on Ground Reflectance Measurements", IEEE Geoscience and Remote Sensing Letters, IEEE Service Center, New York, NY, US, vol. 3, No. 4, , Oct. 1, 2006, pp. 565-569, XP011149586, ISSN 1545-598X.

Schowengerdt, R.: "Remote sensing: models and methods for image processing", Dec. 31, 2007, Academic Press, XP002558565, ISBN: 9780123694072.

Aanaes, H., et al: "Spectrally Consistent Satellite Image Fusion With Improved Image Priors", 2006 7th Nordic Signal Processing Symposium (IEEE Cat. No. 06EX1392) IEEE Piscataway, NJ USA, Jun. 7, 2006-Jun. 9, 2006, pp. 14-17, XP002482502; ISBN: 1-4244-0413-4.

Ager; T.P., et al: "Geo-Positional Accuracy Evaluation of QuickBird Ortho-Ready Standard 2A Multispectral Imagery", Proceedings SPIE, Algorithms and Technologies for Multispectral, Hyperspectral, and Ultraspectral Imagery X, Aug. 12, 2004, pp. 488-499, XP040185047.

Aiazzi, B., et al: "Context-Driven Fusion of High Spatial and Spectral Resolution Images Based on Oversampled Multiresolution Analysis", IEEE Transactions on Geoscience and Remote Sensing, vol. 40, No. 10, Oct. 2002, pp. 2300-2312.

Becker, S., et al: 2005. "Determination and Improvement of Spatial Resolution for Digital Aerial Images", Proceedings of ISPRS Hannover Workshop 2005: High-Resolution Earth Imaging for Geospatial Information, unpaginated CD-ROM, 6p.

Beisl U.: "BDRF Correction in Hyperspectral Imagery", European Space Agency-Publications, 2001, XP002589098.

Beisl, U., et al: "Correction of Atmospheric and Bidirectional Effects in Multispectral ADS40 Images for Mapping Purposes", Internet, Intl. Arch. Photogramm. Remote Sens 2004, XP002588221, Retrieved from the Internet: URL:http://www2.geog.ucl.ac.uk/{mdisney/teaching/PPRS/PPRS_5/orig/atmos_empirical.pdf [retrieved on Jun. 14, 2010].

Eismann, M.T. et al: "Hyperspectral Resolution Enhancement Using High-Resolution Multispectral Imagery With Arbitrary Response Functions", IEEE Transactions on Geoscience and Remote Sensing, IEEE Service Center, Piscataway, NJ, US., vol. 43, No. 3, Mar. 2005, pp. 455-465, ISSN: 0196-2892, p. 456-459.

Garzelli, A., et al: "Interband Structure Modeling for Pan-Sharpening of Very High-Resolution Multispectral Images", Information Fusion Elsevier USA, vol. 6, No. 3, Sep. 2005, pp. 213-224, XP004858824, ISSN: 1566-2535.

Hardie R.C., et al: "MAP Estimation for Hyperspectral Image Resolution Enhancement Using an Auxiliary Sensor", IEEE Transactions on Image Processing, vol. 13, No. 9, Sep. 2004, pp. 1174-1184.

Liu, J.G.: "Smoothing Filter Based Intensity Modulation: A Spectral Preserve Image Fusion Technique for Improving Spatial Details", Int. J. Remote Sensing, Dec. 2000, pp. 3461-3472, vol. 21, No. 18, XP008110993.

Khan, M.M. et al: "Indusion: Fusion of Multispectral and Panchromatic Images Using the Induction Scaling Technique", IEEE Geoscience and Remote Sensing Letters, IEEE Service Center, Jan. 1, 2008, pp. 98-102, vol. 5, No. 1, New York, New York US, XP011197256.

Price J.C.: "Combining Panchromatic and Multispectral Imagery from Dual Resolution Satellite Instruments", Remote Sensing of Environment, No. 21, 1987, pp. 119-128, XP002588220.

Ranchin, T. et al: "Image Fusion—The ARSIS Concept and Some Successful Implementation Schemes" ISPRS J. Photogramm. Remote Sens.; ISPRS Journal of Photogrammetry and Remote Sensing, vol. 58, No. 1-2, Jun. 2003, pp. 4-18, XP002469989.

Schiefer, S. et al: Correcting Brightness Gradient in Hyperspectral Data From Urban Areas, Remote Sensing of Environment, No. 101, 2006, pp. 25-37, XP002588219.

Thomas C. et al: "Synthesis of Multispectral Images to High Spatial Resolution: A Critical Review of Fusion Methods Based on Remote Sensing Physics" IEEE Transactions on Geoscience and Remote Sensing, IEEE Service Center, Piscataway, NJ, US, vol. 46, No. 5, May 2008, pp. 1301-1312.

Zhang, Y: "Understanding Image Fusion", Photogrammetric Engineering & Remote Sensing, Jun. 2004, pp. 657-661.

Kim, Y., et al: "An Experimental Study on the Image-Based Atmospheric Correction Method for High Resolution Multispectral Data", Geoscience and Remote Sensing Symposium, Igarss 2005, Proceedings, 2005 IEEE International Seoul, Korea, Jul. 25-29, 2005, pp. 434-436, vol. 1, Piscataway, New Jersey USA, XP010849008.

Alparone, L., et al. "Comparison of Pansharpening Algorithms: Outcome of the 2006 GRS-S Data-Fusion Contest," Geoscience and Remote Sensing, IEEE Transactions on Geoscience and Remote Sensing, vol. 45, No. 10, pp. 3012-3021, Oct. 2007 doi: 0.1109/TGRS.2007.904923.

Garzelli, A.; Nencini, F.; Capobianco, L.; , "Optimal MMSE Pan Sharpening of Very High Resolution Multispectral Images," Geoscience and Remote Sensing, IEEE Transactions on , vol. 46, No. 1, pp. 228-236, Jan. 2008 doi: 10.1109/TGRS.2007.907604 URL: http://ieeexplore.ieee.org/stamp/stamp.jsp?tp=&arnumber=4389066&isnumber=4407619.

Yang, Y. et al., "An Overview on Pixel-Level Image Fusion in Remote Sensing," Automation and Logistics, 2007 IEEE International Conference on , vol., No., pp. 2339-2344, Aug. 18-21, 2007 doi: 10.1109/ICAL.2007.4338968 URL: http://ieeexplore.ieee.org/stamp/stamp.jsp?tp=&arnumber=4338968&isnumber=4338503.

Zheng, S., et al., "Remote Sensing Image Fusion Using Multiscale Mapped LS-SVM," Geoscience and Remote Sensing, IEEE Transactions on , vol. 46, No. 5, pp. 1313-1322, May 2008 doi: 10.1109/TGRS.2007.912737 URL: http://ieeexplore.ieee.org/stamp/stamp.jsp?tp=&arnumber=4444632&isnumber=4490048.

Joshi, M., et al., "Multiresolution Fusion in Remotely Sensed Images Using an IGMRF Prior and Map Estimation," Geoscience and Remote Sensing Symposium. IGARSS 2008. IEEE International , vol. 2, No., pp. II-269-11-272, Jul. 7-11, 2008 doi: 10.1109/IGARSS.2008.4778979.

* cited by examiner

AUTOMATED ATMOSPHERIC CHARACTERIZATION OF REMOTELY SENSED MULTI-SPECTRAL IMAGERY

BACKGROUND OF THE INVENTION

1. Statement of the Technical Field

The invention concerns image processing, and more particularly, systems and methods for processing remotely acquired imagery.

2. Description of the Related Art

Some satellite imagery tools are commercially available for characterizing atmospheric conditions and for determining the impact of such conditions on the images obtained. However, such tools typically require specialized data. For example, hyperspectral imaging (>100 bands) is typically used for atmospheric characterization, as it typically includes long-wave IR thermal imagery. The IR imagery is then generally used to determine how the location imaged was illuminated by the sun and sky, and how reflected light was being attenuated by the atmosphere. Therefore, based on this data, surface reflectance for the images can be adjusted to enhance final satellite images.

However, when multi-spectral imagery (~4 bands) is used, only reflected visible and near-infrared imagery is typically collected and cannot be generally used for atmospheric characterization. For such imagery, atmospheric conditions in satellite imaging tools are typically derived from the meta-data associated with imagery (i.e., collection date, collection time, sensor position, and coordinates of location imaged). As a result, even commercially available atmospheric modeling tools, such as FLAASH (Fast Line-of-sight Atmospheric Analysis of Spectral Hypercubes) developed by Spectral Sciences Inc., typically default to a generic atmospheric model when used for enhancing non-hyperspectral imagery.

Unfortunately, the generic models used with multi-spectral imagery are generally limited to only capturing and modeling the effects of common gases. That is, generic models typically account only for a fixed number of gases and effects in the atmosphere. Therefore, these generic models often fail to capture or properly model the impact due to other atmospheric effects and gases, such aerosol loading or haze. As a result, when a generic model is used to derive atmospheric effects for adjusting multi-spectral imagery, the lack of proper modeling of these other effects can result in improperly adjusted imagery.

SUMMARY OF THE INVENTION

The invention concerns a method and system for adjusting remotely acquired imagery, such as image data from multi-spectral imaging, based on atmospheric effects and data within the acquired imagery. In a first embodiment of the present invention, a method for processing remotely acquired imagery data is provided. The method includes identifying a region of lowest intensity in each of a plurality of different images for a plurality of different spectral bands and estimating first values for upwelling path radiance for each of said different images according to an intensity in said region in each of said different images. The method further includes selecting a visibility value and calculating second values for said upwelling path radiance for each of said different images, each of said second values based on a radiation transfer model, said radiation model generated using said visibility value and said meta-data. The method also includes comparing said first and said second values for said upwelling path radiance for said different images, adjusting said visibility value based on said comparison, and repeating said calculating, said comparing, and said adjusting steps until a termination condition is met.

In a second embodiment of the present invention, a system for processing remotely acquired imagery data is provided. The system includes a mass storage for receiving imagery data comprising a plurality of different images for a plurality of different spectral bands and meta-data for the different images. The system also includes a processing element. The processing element is configured for identifying a region of lowest intensity in each of the different images and estimating first values for upwelling path radiance for each of the different images according to an intensity in the region in each of the different images. The processing element is further configured for selecting a visibility value and calculating second values for the upwelling path radiance for each of the different images, each of the second values based on a radiation transfer model, the radiation transfer model generated using the visibility value and the meta-data. The processing element is also configured for comparing the first and the second values for the upwelling path radiance for the different images, adjusting the visibility value based on the comparison, and repeating the calculating, the comparing, and the adjusting until a termination condition is met.

In a third embodiment of the present invention, a computer-readable storage, having stored thereon a computer program for processing remotely acquired imagery, is provided. The computer program includes a plurality of code sections. The code sections are executable by a computer to cause the computer to perform the steps of identifying a region of lowest intensity in each of a plurality of different images for a plurality of different spectral bands and estimating first values for upwelling path radiance for each of the different images according to an intensity in the region in each of the different images. The computer program also includes code sections for selecting a visibility value and calculating second values for the upwelling path radiance for each of the different images, each of the second values based on a radiation transfer model, the radiation model generated using on the visibility value and the meta-data. The computer program further includes code sections for comparing the first and the second values for the upwelling path radiance for the different images, adjusting the visibility value based on the comparison; and repeating the calculating, the comparing, and the adjusting steps until a termination condition is met.

DETAILED DESCRIPTION OF THE PREFERRED EMBODIMENTS

Figure 1:
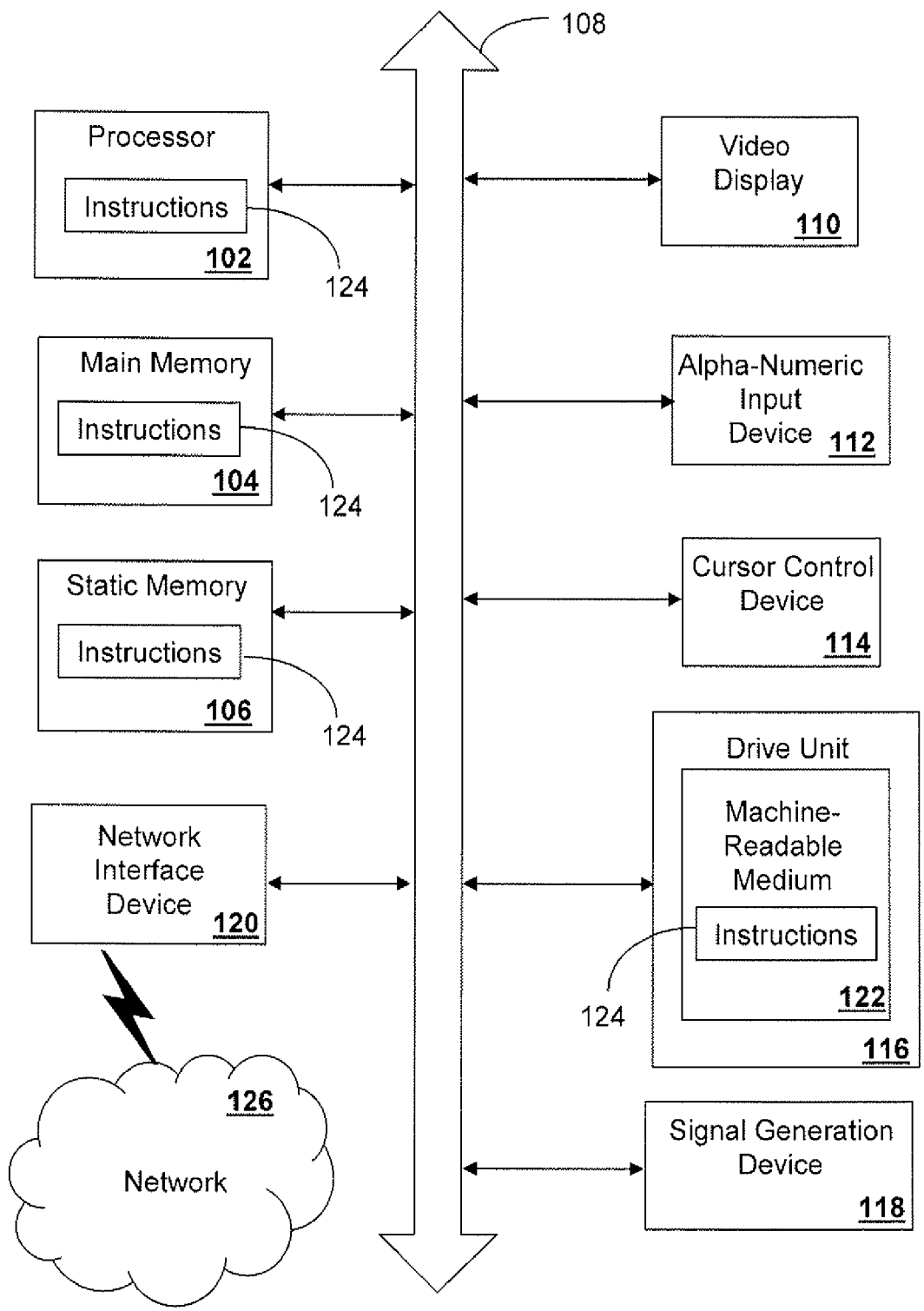
FIG. 1 is a schematic view of a computer system within which a set of instructions operate according to an embodiment of the invention.

Embodiments of the present invention provide systems and methods for adjusting remotely acquired imagery, such as image data from multi-spectral imaging, based on atmospheric effects and data within the acquired imagery. As previously described, some atmospheric effects, such as haze caused by aerosols, cannot be directly obtained from the multi-spectral imagery. Therefore, the impact of such effects on remotely acquired images is typically modeled by calculating a surface reflectance using a generic model. Unfortunately, most generic models have only a limited number of parameters for capturing various types of atmospheric effects on reflectance of light. For example, one atmospheric modeling tool, MODTRAN, developed by the U.S. Air Force, provides only a generic model for atmospheric conditions and does not provide for adjustments based on other conditions. Instead, atmospheric effects, such as haze due to aerosols, are typically modeled by adjusting one or more other parameters available in the model. However, even though these existing generic atmospheric models can be adjusted to simulate the impact of these effects, it can be difficult to determine how much to adjust these parameters to obtain a proper result. For example, in the case of a MODTRAN-based model, an adjustment of the visibility parameter can have a substantial impact on the surface reflectance calculated by the model. Therefore, even minor changes in visibility can result in an incorrect value for surface reflectance and result in improper image adjustment.

The inventors have discovered that although atmospheric effects cannot be directly obtained from multi-spectral imagery and must be separately modeled, the imagery can still be used to determine the magnitude of the adjustments needed in a generic atmospheric model. In particular, the inventors have discovered that low intensity features within different images of the multi-spectral imagery can be used to guide the determination of a final value for one or more parameters in a generic atmospheric model, such as visibility. Although the visibility parameter and one or more other parameter values can be determined in the some embodiments of the present invention, as the number of parameters to be determined increases, a higher number of images is needed. For example, in the case of a four band multi-spectral image, the limited set of data makes determination of parameters other than visibility difficult. The final value for the parameter can then be used to generate a final model of the atmospheric effects on light transmission and/or reflection to determine one or more values for correcting the acquired imagery, such as surface reflectance.

Therefore, the various embodiments of the present invention provide for adjusting remotely acquired imagery using atmospheric modeling adjusted using intensity features within the imagery data. For example, in the case of modeling using MODTRAN, the intensity features can be used to obtain a value for a visibility parameter of a generic modeling tool to simulate the effects of haze on the images. Although the various embodiments of the present invention will be discussed in terms adjusting the visibility parameter in MODTRAN, the invention is not limited in this regard. Rather, intensity features can be also used to determine any appropriate values for any parameter affecting surface reflectance or other illumination-related result.

Embodiments of the present invention are directed at systems and method for determining a visibility value for the low intensity portions of remotely acquired images. In particular, Embodiments of the present invention, provide systems and methods for first identifying the lowest intensity portion in a remotely acquired image. The low intensity portion is then assumed to be associated with a low surface reflectance feature. Therefore, the radiance of these portions collected by a sensor is assumed to be associated with reflectance of light principally due to atmospheric effect such as haze. Accordingly, different values for a visibility parameter in an atmospheric modeling tool are used to generate atmospheric models iteratively until a visibility parameter value is found that provides an atmospheric model that matches the radiance of the low intensity portion in the remotely acquired image. In some embodiments, the visibility parameter for panchromatic/multi-spectral image pairs is determined by generating atmospheric models for the images concurrently. In the various embodiments, the visibility parameter is then used to adjust remotely acquired images to account for haze and other atmospheric effects.

The various embodiments of present invention are specifically embodied as a method, a data processing system, and a computer program product for determining visibility values from low intensity portions of remotely acquired images. Accordingly, the present invention can take the form as an entirely hardware embodiment, an entirely software embodiment, or any combination thereof. However, the invention is not limited in this regard and can be implemented in many other forms not described herein. For example, FIG. 1 is a schematic diagram of an embodiment of a computer system 100 for executing a set of instructions that, when executed, causes the computer system 100 to perform one or more of the methodologies and procedures described herein. In some embodiments, the computer system 100 operates as a standalone device. In other embodiments, the computer system 100 is connected (e.g., using a network) to other computing devices. In a networked deployment, the computer system 100 operates in the capacity of a server or a client developer machine in server-client developer network environment, or as a peer machine in a peer-to-peer (or distributed) network environment.

In the some embodiments, the computer system 100 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 100 includes a processor 102 (such as a central processing unit (CPU), a graphics processing unit (GPU, or both), a main memory 104 and a static memory 106, which communicate with each other via a bus 108. The computer system 100 further includes a display unit 110, such as a video display (e.g., a liquid crystal display or LCD), a flat panel, a solid state display, or a cathode ray tube (CRT)). The computer system also includes an input device 112 (e.g., a keyboard), a cursor control device 114 (e.g., a mouse), a disk drive unit 116, a signal generation device 118 (e.g., a speaker or remote control) and a network interface device 120.

The disk drive unit 116 includes a computer-readable storage medium 122 on which is stored one or more sets of instructions 124 (e.g., software code) configured to implement one or more of the methodologies, procedures, or functions described herein. The instructions 124 reside, completely or at least partially, within the main memory 104, the static memory 106, and/or within the processor 102 during execution thereof by the computer system 100. The main memory 104 and the processor 102 also can constitute machine-readable media.

Those skilled in the art will appreciate that the computer system architecture illustrated in FIG. 1 is one possible example of a computer system. However, the invention is not limited in this regard and any other suitable computer system architecture can also be used without limitation.

For example, dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

Therefore, in some embodiments of the present invention, the present invention is embodied as a computer-readable storage medium containing instructions 124 or that receives and executes instructions 124 from a propagated signal so that a device connected to a network environment 126 sends or receive voice and/or video data and that communicate over the network 126 using the instructions 124. The instructions 124 are further transmitted or received over a network 126 via the network interface device 120.

While the computer-readable storage medium 122 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Figure 2:
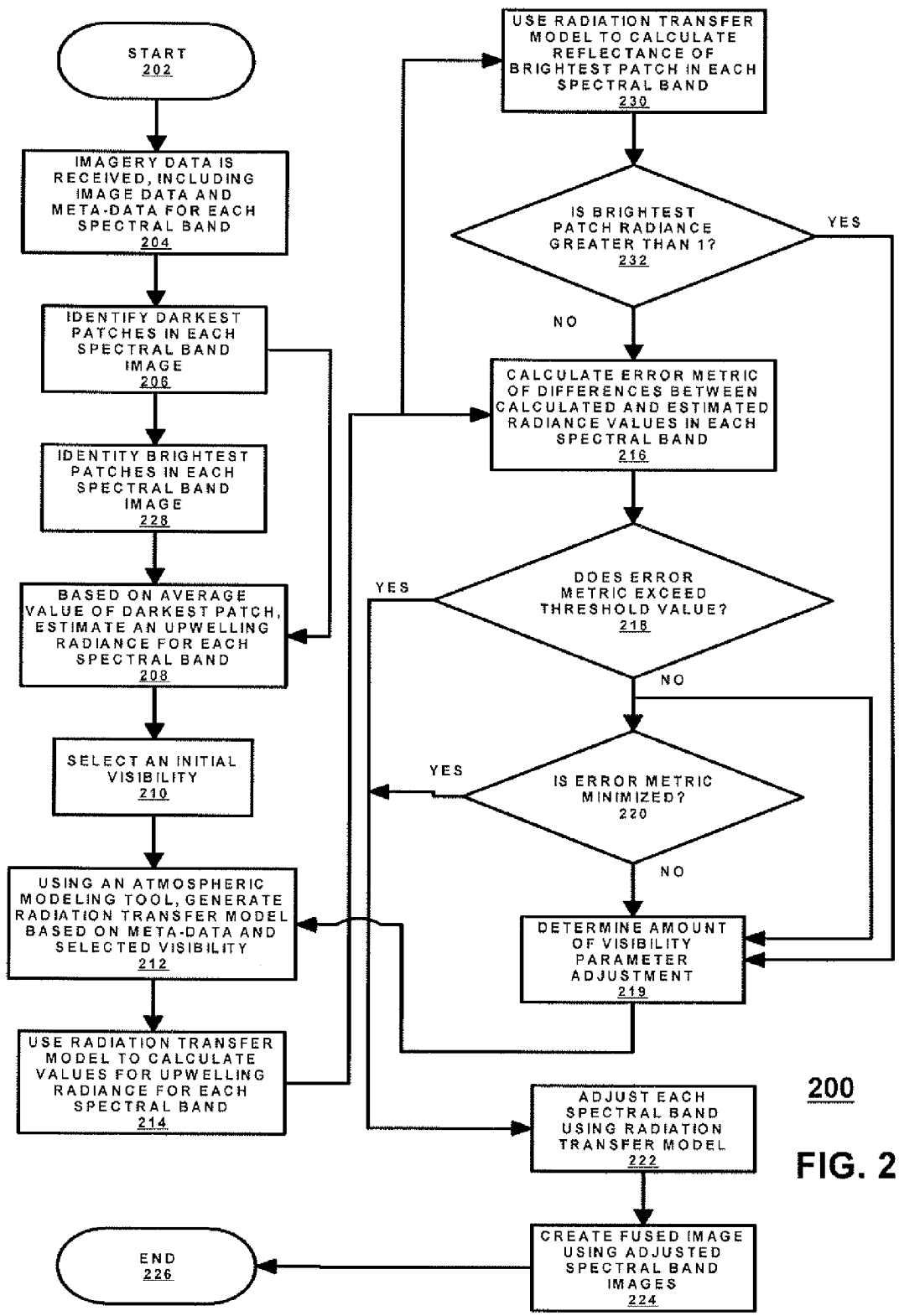
FIG. 2 is a flowchart of steps in an exemplary method for adjusting remotely acquired imagery according to an embodiment of the present invention.

The present invention will now be described in greater detail in relation to the flowchart in FIG. 2, illustrating steps in an exemplary method 200 for processing remote imagery data based according to the various embodiments of the present invention. It should be appreciated, however, that the exemplary process disclosed in FIG. 2 is provided for purposes of illustration only and that the present invention is not limited in this regard.

As used herein, "remote imagery data" can refer to any set of data defining an image pair. That is, the remote imagery data includes image data and any type of meta-data associated with a first and at least a second image to be combined. The image data is acquired from any remotely positioned sensor or imaging device. For example, the remote sensor can be positioned to operate on, by way of example and not limitation, an elevated viewing structure, an aircraft, a spacecraft, or man-made satellite. That is, the remote data is acquired from any position, fixed or mobile, that is elevated with respect to the imaged location. The image data can include light intensity data for an image acquired using only a particular range of wavelengths (i.e., a spectral band). Therefore, in the various embodiments of the present invention, the remote imagery data comprises multi-spectral (~4 bands), hyper-spectral (>100 bands), and/or panchromatic (visible band) image data.

The remote imagery data described herein are further assumed to have certain other characteristics. During the time between collection of the various images, moving objects such as vehicles and ocean waves are not likely to be registered correctly between the two images, leading to error in registration and calibration. If the time between the acquisitions of the images is more than a few minutes, the change in position of the sun will result in significant changes in shadows and variations in the illumination of the surface based on how well the surface normals are aligned with the sun. This can result in significant calibration and registration errors. If days pass between the collection of the images, there can be significant changes in atmospheric conditions. If months pass, there can be significant changes in the surface properties due to ice, snow, rain, leaves falling from the trees, new growth. Therefore, one of ordinary skill in the art will recognize that better results are obtained in subsequent processes for combining the images if the different images can be acquired within a very short time frame of each other. Similarly, the different images can also be acquired from nearly the same position to further reduce registration errors. Still, it will be understood by those skilled in the art that the present invention can be utilized in connection different with images that do not satisfy these criteria, possibility with degraded results. Accordingly, image pairs can be obtained using differently positioned sensors, obtained at different times, or both. However, such image pairs can result in more complex registration processes, including more complex or multiple shifting, scaling, and rotation processes. As used herein, a "composite image" refers to any image resulting from the combination of any types of image data. For example, a composite image is produced from the combination of the image data from each spectral band in multi-spectral or hyper-spectral imagery. However, the invention is not limited in this regard and a composite image can be produced from the fusion of multi-spectral or hyper-spectral image data with panchromatic image data.

For exemplary method 200, the remote imagery data comprises an image pair including panchromatic and multi-spectral images and associated meta-data. By way of example and not limitation, the meta-data includes information identifying a date, a time, and the geographic location for the images. For example, geographic coordinates for the four corners of a rectangular image can be provided in the meta-data. Other information can also be included in the meta-data, including any additional information regarding the sensor or the location being imaged.

Regardless of the type of image data included in the remote imagery data, method 200 begins in step 202 and continues to step 204, in which the remote imagery data to be processed is received. As previously described, the imagery data not only includes image data, but also meta-data associated with the images. By way of example, not limitation, the meta-data includes a date and time the image data was acquired, a position of the sensor acquiring the remote imagery data, coordinates of the location being imaged, and other identifying information for the remote imagery data. The other identifying information can include, for example, identification of particular types of features within the image data or the types and values of parameters used by the sensor for acquiring the remote imagery data.

As previously described, the inventors have discovered that low intensity features within the remote imagery data can be used to determine the value for visibility parameter used in an atmospheric model. In particular, the inventors have discovered that by identifying low intensity features within each set of image data in the remote imagery data, an accurate estimate of the upwelling path radiance, the light collected by a sensor that is directly reflected aerosols (haze) and other atmospheric components, can be obtained for each set of image data. Accordingly, this visibility parameter value then be used to adjust the entire image, including high reflectance regions.

Figure 3:
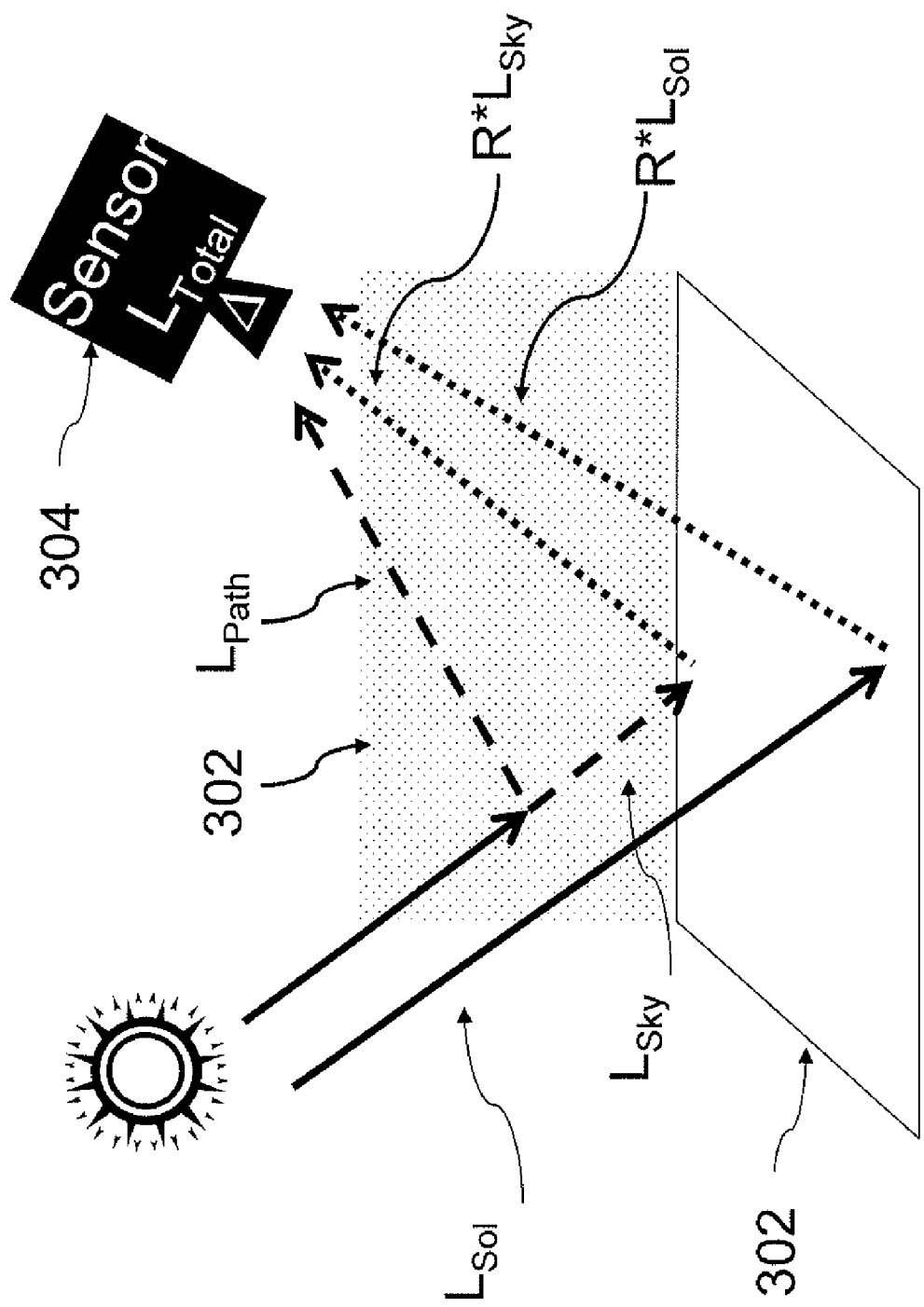
FIG. 3 is a conceptual illustration showing the various components of the radiance collected by a remote sensor.

The intensity data in the images can correlate directly to a radiance collected by a sensor. Typically, the total radiance (i.e., the intensity of light) collected by a sensor is represented by the sum of atmospheric reflected component and a surface reflected component. This is conceptually illustrated in FIG. 3. In FIG. 3, the sun or other light source provides a total amount of radiance $L_{Total}$ directed to a surface 302 being imaged. A portion of this total radiance is reflected upwards by the atmosphere 304, resulting in a radiance $L_{Path}$ describing the upwelling path radiance. A second portion of this total radiance is reflected and/or scattered by the atmosphere 304 downwards towards the surface 302, resulting in a radiance $L_{Sky}$ describing the "blue-sky" radiance. A third portion of this total radiance reaches the surface 302, resulting in a radiance $L_{Sol}$ describing direct solar radiance on surface 302. Therefore, a sensor 306 ultimately detects a total radiance $L_{Total}$ based on the amount of upwelling path radiance $L_{Path}$ reaching the sensor 306 and the amounts of direct solar radiance $L_{Sol}$ and blue-sky radiance $L_{Sky}$ reflected by the surface 302 and reaching the sensor 306. Mathematically, this total radiance collected by a sensor can be described as follows in equation (1):

$$L_{Total}(\lambda) = L_{path}(\lambda) + R(\lambda)[L_{Solar}(\lambda)\cos(A) + L_{Sky}(\lambda)] \tag{1}$$

Where:
$L_{path}(\lambda)$ is the upwelling path radiance collected by the sensor,
$R(\lambda)$ is the reflectance for a particular wavelength of light,
$L_{Solar}(\lambda)$ is the surface reflected direct solar radiance,
$L_{Sky}(\lambda)$ is the surface reflected blue-sky radiance, and
$\cos(A)$ can be a constant, assuming a flat surface being imaged.

However, when low reflectance features are imaged, the total intensity of these features is typically low. That is, the value of the total radiance ($L_{Total}$) collected by the sensor is low. This is because in low surface reflectance features, the contribution from light reflected by the surface ($R*L_{Sol}$, $R*L_{Sky}$) is minimized. For these features, the resulting radiance or intensity is then principally comprised of the reflection of light from the atmosphere ($L_{Path}$), which includes the contribution of haze in the atmosphere. Low intensity features in remote imagery data are commonly associated with low reflectance features, such as bodies of water or deep shadows. Therefore, an estimate of the upwelling path radiance for an image can be obtained when these types of low reflectance features are present in the acquired image data.

In step 206, the image data is analyzed to identify the low intensity features in each image acquired. That is, the image data is analyzed to find a group of pixels associated with a lowest intensity in an image. Noise in the collected radiance image generally leads to underestimating the radiance of low intensity features of the images. Therefore, by combining adjacent pixels to improve this estimate, the impact of noise is reduced. These groups of adjacent pixels, referred to herein as a "dark patch", are used to estimate the upwelling path radiance for the image. In the various embodiments of the invention, the dark patch can be associated with any number of adjacent pixels. However, the inventors have discovered that a minimum number of pixels are required for the dark patch to ensure that the upwelling path radiance is not underestimated. For example, if only a small number of pixels are included in the dark patch being analyzed, the noise in the image data can skew the estimated upwelling path radiance. However, the inventors have also discovered that if the number of pixels in dark patch too large, the likelihood of finding a dark patch purely or mainly dominated by pixels associated with low reflectance features is reduced. Therefore in the various embodiments of the present invention, a dark patch is identified by specifying a fixed pixel area, where the area can be selected based on the spatial and/or spectral resolution of the images and/or the sensor configuration. For example, for a 2000×2000 pixel image acquired using typical multi-spectral imaging (blue, red, green, and near-infrared), a 4-pixel by 4-pixel area has been found to be sufficient to identify pure or predominately low intensity regions without being affected by noise. Increasing the size of the patch beyond 4×4 provides only an incremental improvement in reducing the impact of noise (signal-to-noise ratio ~1/N, where N=number of pixels in dark patch), but increases the probability that the dark patch will have some pixels with non-trivial reflectance. This specific configuration is provided by way of example, not limitation, and the fixed pixel area for other sensor configuration can vary according to the spectral and/or spatial resolution of the acquired images.

Once a dark patch is identified in step 206 for each of the images in the remote imagery data, in step 208 the average stored intensity value for each identified dark patch are converted to an upwelling path radiance for each image. Alternatively, the stored intensity value of each pixel in the dark patch can first be converted to a radiance value and then averaged. Regardless of how the average radiance values for the dark patches are calculated, a conversion from a stored intensity to an actual radiance value is required. This is because the stored intensity values in the imagery data are not true light intensity values, but digital numbers derived from actual light intensity or radiance detected by the sensor. These digital numbers are typically used to allow the image data to be stored in a digital format to conserve space. Therefore, the actual light intensity or radiance measured by the sensor is normally converted to digital numbers in a fixed range to limit the number of bits required in a memory element. For example, digital data for a group of images can comprise stored intensity values between 0 and 2047. Accordingly, the actual radiance values can be retrieved from the image data by scaling or converting the stored intensity back to actual radiance values. Therefore, the digital image data for each band of a multi-spectral image can be stored using a particular radiometric calibration to allow the digital numbers to be linearly scaled to radiance values using a gain and an offset. Thus, the actual radiance or light intensity of each pixel can be expressed as: Radiance=Gain*(Digital Number)+Offset. One of ordinary skill in the art will understand that for each image associated with a different spectral band, the gain and offset can be different.

Once the average upwelling path radiance for each band is calculated in step 208, an initial visibility value is selected in step 210. Visibility is a measure of the distance at which an object or light can be clearly discerned. That is, the amount of transparency of the air. In the various embodiments of the present invention, the initial visibility value can be selected in any number of ways. For example, a default value can be used for any set of images. For example, a value of 30 km, generally accepted to describe visibility on a clear day can be initially selected. However, an estimated visibility can be included in the meta-data, where the visibility is based on a local visibility reported by a local source, such as an airport or weather reporting authority.

Using the visibility value from step 206 and the meta-data in the imagery data, a radiation transfer model is then generated with an atmospheric modeling tool in step 212. In particular, the atmospheric modeling tool generates equation (1) based on the meta-data and the initial visibility value. In particular, the atmospheric modeling tool uses the local conditions to generate a radiation transfer model for the different wavelengths of light with high spectral resolution. In particular, the sensor geometry parameters obtained from the meta-data are held fixed. The modeling tool thus not only provides a model for the total radiance, but also provides a model for the upwelling path radiance component in equation (1). This model is then used in conjunction with known sensor spectral response curves for each spectral band to determine the fraction of the total radiance collected by each spectral band.

Figure 4:
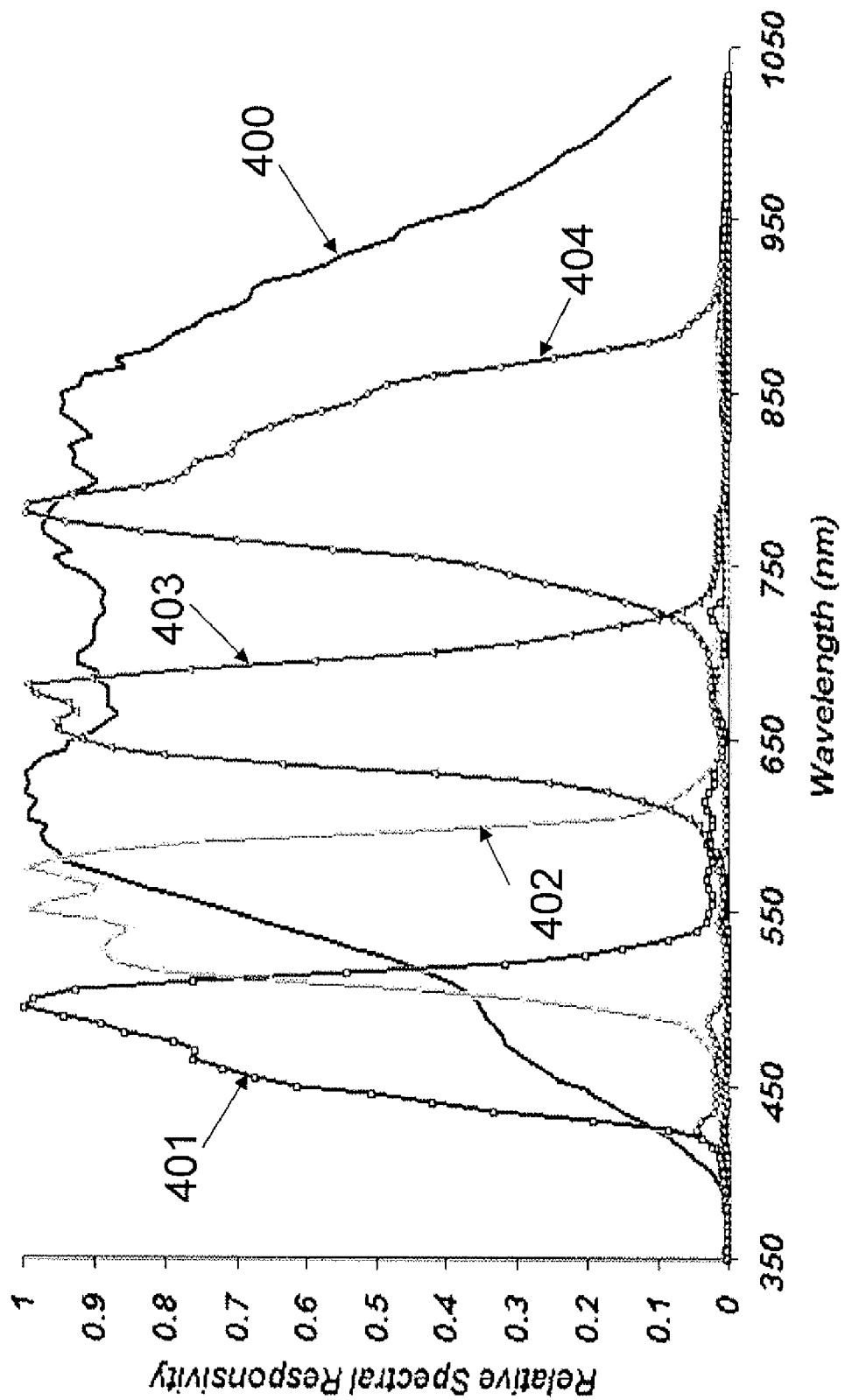
FIG. 4 is a plot showing an example of a spectral response of sensors used to create a panchromatic image and a multi-spectral image according to the various embodiments of the present invention.

One of ordinary skill in art will recognize that a multi-spectral image of a particular scene is actually comprised of several optical or spectral image bands. In each of these optical bands the sensor is responsive to a very limited range of optical wavelengths. This concept is illustrated in FIG. 4 which shows curves 401, 402, 403, 404 which represent a sensor's response to four different optical bands. Thus, the sensor essentially creates one image for each optical band represented by each of the response curves 401, 402, 403, 404. Those skilled in the art will appreciate that different sensor systems can have more or fewer optical bands and accordingly, more or fewer spectral response curves for each optical band. In contrast, a panchromatic image is a single image which is obtained by a sensor that is responsive to a much wider range of optical wavelengths. In FIG. 4, the response of the panchromatic sensor is illustrated by curve 400.

Consequently, because the spectral response curve for each band defines its relative sensitivity to the various wavelengths of light, each of the spectral response curves is used as a band pass filter to modulate the radiation transfer model for a particular spectral band. That is, provide a radiation transfer model that is filtered according to the spectral response curve of each spectral band. Therefore, based on the modulated radiation transfer model, the upwelling path radiance is calculated for a particular spectral band in step 214. In the case of a MODTRAN-based system, for each MSI band the intensity values in the images are converted to radiance values. The high-resolution MODTRAN results are then spectrally downsampled to the MSI bands by applying the spectral response curve of each band. The radiance of each narrow slice of each MODTRAN component spectrum is then weighted based on the response of the band and summed to find the radiance of each atmospheric component for each band.

Figure 5:
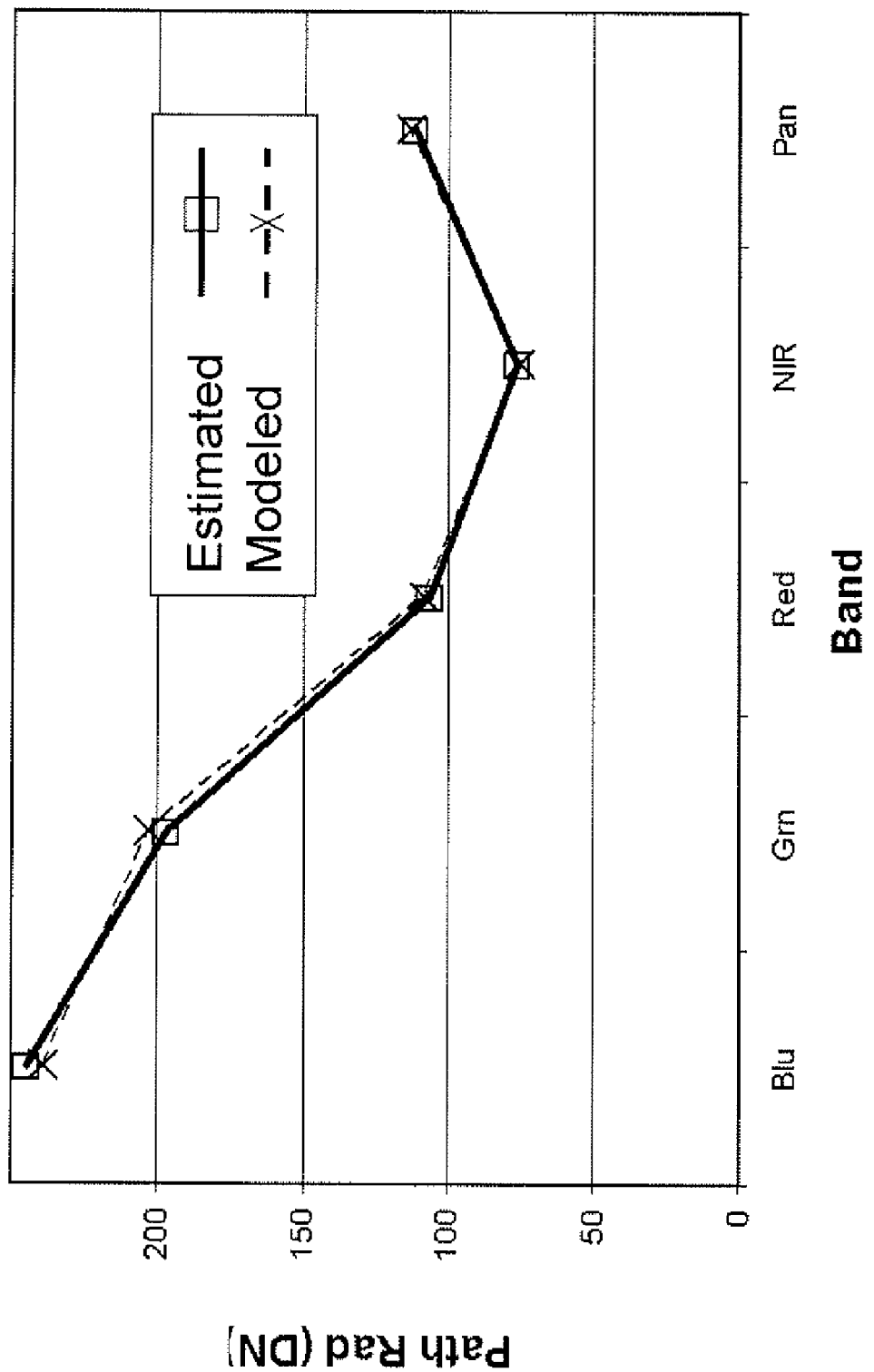
FIG. 5 is a two-dimensional graph which shows an exemplary result of comparing dark patch estimated upwelling path radiances and upwelling path radiances calculated using an atmospheric model according to an embodiment of the present invention.

However, the calculated upwelling path radiance from step 214 may not be equal to the estimated upwelling path radiance from step 208 for each of the spectral bands. Therefore, in step 216, once the upwelling path radiance is calculated for each spectral band, the calculated upwelling path radiances are collectively compared to the estimated upwelling path radiances based on the dark patches in the images. For example, FIG. 5 shows a two-dimensional (2-D) graph plotting exemplary upwelling path radiances estimated from dark patches and calculated from an atmospheric model for each images associated with a spectral band. The exemplary data in the 2-D graph illustratively shows that the estimated and calculated values for the upwelling path radiance have similar values. However, even if a fairly good match is obtained, its is possible that further adjustments in the visibility parameter can provide an even closer match between the estimated and calculated upwelling path radiance values for the images. Therefore, another aspect of the present invention provides for evaluating of the degree of matching between the calculated and estimated radiances. In particular, an error metric is calculated that describes the amount of matching. For example, the error metric can comprise a root-mean-square (RMS) difference in some embodiments. However, other types of error metric calculation can also be used with other embodiments of the present invention.

Once the error metric is calculated in step 216, the error metric is compared to a threshold value in step 218 to determine if further adjustment of the visibility parameter is required. For example, when an RMS difference is calculated, a threshold RMS value can be selected so that even if further adjustment of the visibility parameter can result in a closer match between the estimated and calculated upwelling path radiance values, the current visibility value still describes the atmospheric conditions with a high degree of accuracy.

If the error metric threshold has not been met in step 218, a new visibility value is selected in step 219. The new visibility value can be selected by determining an amount for visibility parameter adjustment in step 219. Typically, as visibility is increased, the upwelling path radiance decreases. Therefore, in some embodiments of the present invention, the adjustment of the visibility parameter can be based on the difference between the calculated and estimates radiances. For example, if the calculated radiances are higher than the estimated radiances, then the visibility needs to be increased to reduce the values for the calculated radiances. Conversely, if the calculated radiances are lower than the estimated radiances, then the visibility needs to be decreased to increase the values for the calculated radiances. In any event, in step 219, the visibility value is adjusted to increase or decrease the upwelling path radiances as needed.

In some embodiments, the amount of adjustment necessary to the visibility value can be estimated from the estimated and calculated radiances. For example, the average difference between the calculated and estimated radiances for each spectral band can be calculated and used to determine the amount of adjustment for the visibility parameter. As previously discussed, a small adjustment in visibility can result in a large shift in radiance. Therefore, the correct amount of visibility parameter adjustment can be estimated. In particular, the difference between the estimated and calculated upwelling path radiances can be multiplied by a gain factor to determine an amount of adjustment, where the gain factor is the derivative of the calculated upwelling path radiance as a function of visibility. For example, if the calculated values of upwelling path radiance are plotted versus the visibility values used to obtain them, the slope or derivative of the resulting function can define the gain to be used for adjusting the visibility value. Such derivatives are computed numerically due to the complexity of the non-linear atmospheric model However, even when the gain is used to determine the amount of correction is carefully determined, overshoot of the final value can still occur. Therefore, in some embodiments the amount of visibility parameter adjustment can be limited to prevent overshoot. For example, the amount of visibility parameter shift can be limited to less than ten percent.

Separately, or in combination with steps 218 and 219, the method 200 can also determine whether an error metric has been minimized in step 220. In such embodiments, the changes in the error metric can be tracked versus the amount of visibility parameter adjustment. If the direction of the error metric changes, it can be assumed that a minimum value for the error metric has been reached. For example, upon detection of a sign change in the change in the error metric, the minimum error solution can be assumed to have been reached and the existing radiation model can be used for adjusting the different images in step 222. However, in other embodiments, the detection of a sign change can instead be used to allow for further refinement of the visibility parameter. For example, in such embodiments, the detection of a sign change can instead be used to readjust the amount of visibility parameter adjustment in step 219. In yet other embodiments, the number of iterations can be limited and the minimum error metric can be determined to have been reached when the maximum number of allowed iterations has been reached.

Once a new visibility value is selected in step 219, a new radiation transfer model is generated and new upwelling path radiance values are calculated starting with step 212. However, if the error metric threshold has been met in step 218 and/or a minimum error metric value has been reached in step 220, the visibility parameter from the model can be determined to have been optimized to reflect actual illumination conditions in the different images. Consequently, the radiation transfer model is used to make a final haze adjustment for each image associated with a spectral band in step 222. Once the images for each spectral band are adjusted for haze, a final composite image can be formed in step 224 and the process can end in step 226.

In some embodiments, the radiation transfer model may have been generated using specific modeling parameters optimized for determining the amount of haze over a low reflectance regions. However, as previously described, the total amount of illumination can also be affected by direct solar and blue-sky radiance light. Therefore, in some embodiments of the present invention, prior to the final adjustment of the images in step 222, a radiation transfer model can be generated using not only the determined visibility parameter, but also including other parameters. For example, other types of aerosol models, exclusive of visibility, and estimated surface wind speed, each of which affect haze can used in step 222.

Additionally, even though the dark patches can be solely used in the various embodiments of the present invention to determine a value for the visibility parameter, in some embodiments, the adjustment of the visibility parameter can be bounded. That is, a radiation transfer model can be generated that does not exceed physical limitations. For example, because a reflectance value cannot exceed a value of 1, digital numbers, once converted to radiance values, cannot result in a radiation transfer function that requires reflectance to exceed a value of 1. For example, the generated radiation transfer function provides $L_{Path}$, $L_{Sol}$, and $L_{Sky}$. The reflectance can then be calculated by setting $L_{Total}$ to the bright patch radiance value in equation (1) and solving for reflectance. Accordingly, if this value, based on the modeled radiance values and the some reference radiance value in the images, an adjustment of the upwelling path radiance can be needed if the reflectance is required to be greater than 1. In method 200, this evaluation can be accomplished by analyzing the brightest patches in the images. These bright patches provide the necessary reference radiance value since they would include the contribution of the path radiance and the maximum amount of reflected surface illumination reaching the sensor. For example, in a MODTRAN-based system, the high-resolution MODTRAN results for $L_{Sol}$ and $L_{Sky}$ are spectrally downsampled to each band based on its spectral response similar to $L_{Path}$. If the pixel footprint on the surface is assumed to perfectly aligned with the sun for maximum illumination and the surface is assumed to be a perfect diffuse reflector, then the maximum radiance should be the sum of the three atmospheric components $L_{MAX} = L_{Path} + L_{Sol} + L_{Sky}$. If the radiance of the bright patch exceeds this maximum radiance, the model does not fit the image.

Therefore, subsequently or in combination with identifying dark patches in step 206, the method 200 can also identify the brightest patches in step 228. In such embodiments, the same fixed pixel area can be used to identify regions in the images having the highest intensity as the brightest patches. Therefore, once the radiation transfer model is generated in step 212, not only can upwelling path radiances be calculated in step 214 for the dark patches, but the local radiance for the brightest patches can also be calculated in step 230. Afterwards, in step 232, if the reflectance is greater than 1 for any of the brightest patches, the visibility value needs to be adjusted in step 219. In such cases, the visibility parameter adjustment can be calculated based on the amount of radiance adjustment needed for the bright patches. Afterwards, this difference can be used with the gain, as previously described, to determine an adjustment amount. However, if the reflectance is <1, the method 200 can proceed starting with step 216 and as previously described, to continue adjustment of the visibility parameter and subsequent formation of a composite image.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

We claim:

1. A method for processing remotely acquired imagery data, comprising:
    identifying, by at least one electronic circuit, a region of lowest intensity in each of a plurality of different images for a plurality of different spectral bands;
    estimating, by said electronic circuit, first values for upwelling path radiance for each of said different images according to an intensity in said region in each of said different images;
    selecting, by said electronic circuit, a visibility value;
    calculating, by said electronic circuit, second values for said upwelling path radiance for each of said different images, each of said second values based on a radiation transfer model, said radiation model generated using said visibility value and said meta-data;
    comparing, by said electronic circuit, said first and said second values for said upwelling path radiance for said different images;
    adjusting, by said electronic circuit, said visibility value based on said comparison; and
    repeating, by said electronic circuit, said calculating, said comparing, and said adjusting steps until a termination condition is met.

2. The method of claim 1, further comprising:
    prior to the step of comparing, locating by said electronic circuit a region of highest intensity in each of said different images;
    obtaining, by said electronic circuit, reflectance values based on said radiation transfer model and a radiance of said located regions; and
    if at least one of said reflectance values exceeds a threshold radiance value, adjusting by said electronic circuit said visibility value based on an amount of said reflectance exceeding said threshold reflectance amount and repeating said calculating step.

3. The method of claim 1, wherein said comparing step further comprises obtaining a measure of a difference between said first and said second radiance values for said different images, and wherein said step of adjusting further comprises calculating an adjustment amount for said visibility value based on said measure.

4. The method of claim 1, wherein said step of determining further comprising:
    calculating, by said electronic circuit, an average intensity for each combination of pixels within a fixed pixel area for each of said different images; and
    selecting, by said electronic circuit, one of said combinations in each of said different images having a lowest average intensity.

5. The method of claim 1, further comprising:
    adjusting, by said electronic circuit, said different images using said radiation transfer model; and
    combining, by said electronic circuit, said different images into a single composite image.

6. The method of claim 1, wherein said termination condition is at least one among a direction for said adjustment for said visibility value reversing, an error metric associated with said comparison reaching a threshold value, or a number of iterations said exceeding a maximum iteration count.

7. The method of claim 6, wherein said error metric comprises a root mean square difference between said first and said second values for said upwelling path radiance.

8. A system for processing remotely acquired imagery data, comprising:
    at least one electronic circuit configured to perform the following operations:
        receive imagery data comprising a plurality of different images for a plurality of different spectral bands and meta-data for said different images;
        identify a region of lowest intensity in each of said different images;
        estimate first values for upwelling path radiance for each of said different images according to an intensity in said region in each of said different images;
        select a visibility value;
        calculate second values for said upwelling path radiance for each of said different images, each of said second values based on a radiation transfer model, said radiation transfer model generated using said visibility value and said meta-data;
        compare said first value and said second value for said upwelling path radiance for said different images;
        adjust said visibility value based on said comparison; and
        repeat said calculation, said comparison, and said adjustment operations until a termination condition is met.

9. The system of claim 8, wherein said electronic circuit is further configured to:
    locate a region of highest intensity in each of said different images prior to comparing said first and second values;
    obtain reflectance values based on said radiation transfer model and a radiance of said located regions; and
    if at least one of said reflectance values exceeds a threshold radiance value, adjust said visibility value based on an amount of said reflectance exceeding said threshold reflectance amount and repeating said calculation operation.

10. The system of claim 8, wherein said electronic circuit is further configured to measure a difference between said first and said second radiance values for said different images, and calculate an adjustment amount for said visibility value based on said measure.

11. The system of claim 8, wherein said electronic circuit is further configured to:
    calculate an average intensity for each combination of pixels within a fixed pixel area for each of said different images; and select one of said combinations in each of said different images having a lowest average intensity.

12. The system of claim 8, wherein said electronic circuit is further configured to:
adjust said different images using said radiation transfer model; and
combine said different images into a single composite image.

13. The system of claim 8, wherein said termination condition is at least one among a direction for said adjustment of said visibility value reversing, an error metric associated with said comparison reaching a threshold value, or a number of iterations said exceeding an maximum iteration count.

14. The method of claim 13, wherein said error metric comprises a root mean square difference between said first and said second values for said upwelling path radiance.

15. A computer-readable storage, having stored thereon a computer program for processing remotely acquired imagery, the computer program having a plurality of code sections, the code sections executable by a computer to cause the computer to perform the steps of:
identifying a region of lowest intensity in each of a plurality of different images for a plurality of different spectral bands;
estimating first values for upwelling path radiance for each of said different images according to an intensity in said region in each of said different images;
selecting a visibility value;
calculating second values for said upwelling path radiance for each of said different images, each of said second values based on a radiation transfer model, said radiation model generated using on said visibility value and said meta-data;
comparing said first and said second values for said upwelling path radiance for said different images;
adjusting said visibility value based on said comparison; and
repeating said calculating, said comparing, and said adjusting steps until a termination condition is met.

16. The computer-readable storage of claim 15, further comprising:
prior to the step of comparing, locating a region of highest intensity in each of said different images;
obtaining reflectance values based on said radiation transfer model and a radiance of said located regions; and
if at least one of said reflectance values exceeds a threshold radiance value, adjusting said visibility value based on an amount of said one reflectance exceeding said threshold reflectance amount and repeating said calculating step.

17. The computer-readable storage of claim 15, wherein said comparing step further comprises obtaining a measure of a difference between said first and said second radiance values for said different images, and wherein said step of adjusting further comprises calculating an adjustment amount for said visibility value based on said measure.

18. The computer-readable storage of claim 15, said step of determining further comprising:
calculating an average intensity for each combination of pixels within a fixed pixel area for each of said different images; and
selecting a one of said combinations in each of said different images having a lowest average intensity.

19. The computer-readable storage of claim 15, further comprising:
adjusting said different images using said radiation transfer model; and
combining said different images into a single composite image.

20. The computer-readable storage of claim 15, wherein said termination condition is at least one among a direction for said adjustment for said visibility value reversing, an error metric associated with said comparison reaching a threshold value, or a number of iterations said exceeding an maximum iteration count.

* * * * *